United States Patent [19]

Davidson

[11] Patent Number: 4,958,618
[45] Date of Patent: Sep. 25, 1990

[54] FOLDING DISPOSABLE COOKERY UNIT

[76] Inventor: Peter Davidson, P.O. Box 3731, Stanford, Calif. 94309

[21] Appl. No.: 447,887

[22] Filed: Dec. 8, 1989

Related U.S. Application Data

[63] Continuation-in-part of Ser. No. 296,529, Jan. 12, 1989, abandoned.

[51] Int. Cl.$^5$ .............................................. F24C 1/16
[52] U.S. Cl. ................................. 126/9 B; 126/25 R; 99/450
[58] Field of Search ............... 126/9 R, 9 A, 9 B, 29, 126/30, 25 R, 25 A, 25 B, 15, 262; 44/520; 206/216, 525; 99/450, 449, 447, 448

[56] References Cited

U.S. PATENT DOCUMENTS

| | | | |
|---|---|---|---|
| 2,673,003 | 3/1954 | Stewart | 126/9 A |
| 2,875,683 | 3/1959 | Burns | 99/425 |
| 2,965,096 | 12/1960 | Barton | 126/25 R |
| 2,981,249 | 4/1961 | Russell et al. | 126/25 R |
| 3,156,234 | 11/1964 | Steinberg | 126/451 |
| 3,279,453 | 10/1966 | Morehad et al. | 126/9 A |
| 3,288,050 | 11/1966 | Saiki | 126/25 R |
| 3,353,527 | 11/1967 | Anderson | 126/9 A |
| 3,370,582 | 2/1968 | Rauh | 126/25 R |
| 3,385,282 | 5/1968 | Lloyd | 126/9 R |
| 3,394,693 | 7/1968 | Robinson | 126/9 R |
| 3,407,803 | 10/1968 | Cervenak | 126/25 R |
| 3,478,733 | 11/1969 | Meyerhoefer | 126/25 R |
| 3,491,743 | 1/1970 | Temp | 126/9 R |
| 3,575,156 | 4/1971 | Hosford | 126/25 R |
| 3,589,353 | 6/1971 | Sanders | 126/9 A |
| 3,625,195 | 12/1971 | Grall | 126/9 A |
| 3,682,154 | 8/1972 | Mollere | 126/9 A |
| 3,684,087 | 8/1972 | Anderson | 126/9 A |
| 3,727,979 | 4/1973 | Schier et al. | 126/9 A |
| 3,841,298 | 10/1974 | Sellors | 126/9 A |
| 4,254,863 | 3/1981 | Katcs et al. | 126/9 A |
| 4,489,706 | 12/1984 | Hait | 126/9 R |
| 4,508,094 | 4/1985 | Hait | 126/9 R |
| 4,530,343 | 7/1985 | Beck | 126/25 R |
| 4,531,505 | 7/1985 | Hait et al. | 126/9 R |
| 4,531,506 | 7/1985 | Chambers et al. | 126/25 R |
| 4,539,973 | 9/1985 | Hait | 126/9 R |
| 4,545,359 | 10/1985 | Hait | 126/9 R |
| 4,762,525 | 8/1988 | Wood | 126/9 A |

Primary Examiner—James C. Yeung
Attorney, Agent, or Firm—Limbach, Limbach & Sutton

[57] ABSTRACT

A portable cooking apparatus is disclosed having a foldable firebox body made up of a bottom panel, a plurality of side panels sequentially hinged together and hingedly connected to the bottom panel and with each side panel hinged for folding the panel portions in overlapping relationship so that the side panels can be folded into a body closed position with the side panel portions overlapping for enclosing material such as a fuel supply, an igniter for the fuel supply, and utensils between the bottom panel and the folded overlapping side panels. With the side panel portions unfolded the body is in open position for supporting a cooking surface around the top edges of the side panels. The foldable body can include downwardly projecting bosses to position the body on a support surface, upwardly projecting bosses for supporting the fuel member, and apertures for air to aid in combustion. The fuel supply can be a preformed charcoal member having a base portion and a plurality of pyramidal portions projecting upwardly from the base and the igniting member can extend over and around the pyramidal portions of the charcoal member.

32 Claims, 4 Drawing Sheets

FOLDING DISPOSABLE COOKERY UNIT

This application is a continuation-in-part of application Ser. No. 296,529 filed Jan. 12, 1989, abandoned, bearing the same title.

TECHNICAL FIELD

The present invention relates to a barbecue grilling unit which is compact, portable, inexpensive, easy to use, truly disposable and yet does not sacrifice the cooking features of more standard barbecue units.

BACKGROUND OF THE INVENTION

Outdoor barbecue cookery continues to grow in popularity despite certain difficulties and inconveniences. These drawbacks have principally to do with setting up, fueling, and cleaning the barbecue unit, as well as any subsequent disposal of waste from the barbecuing process.

Heretofore, there has been considerable effort to developing alternatives to the more standard, substantially fixed, metal barbecue unit. This effort continues because the need for an easy to use, inexpensive, portable, safe, and environmentally responsible unit has not been met. The prior art is replete with examples of substantially metal devices which are cumbersome in setup, use, and cleanup, provide an undesirable cooking surface, and are disposable only because they can be hauled to the garbage bin. Furthermore, there has been little attempt at grappling with the problems of the environmental impact of the disposal of these devices.

Whereas, in contrast, the present invention offers the following attributes and advantages over the prior art:

1. a paper package, completely self-contained, converts from a convenient, smaller package for storage and carrying to a firebox containing specially shaped charcoal and starter;
2. the folded out firebox supports an attractive, aluminum or ceramic coated fiber-based grill which is easy to clean because there are no cross bars in the grate design.
3. the firebox is disposable by its nature and design which means, for example, that it is lightweight and substantially water degradable;
4. the package is usable where portability, infrequent use or cleanup makes other grilling methods less attractive, for example:
   at a beach or public park picnic ground,
   on an apartment balcony or
   for quick lunchtime or snack cookery;
5. the firebox is fireproof, self-supporting and will not burn the surface underneath;
6. the package and firebox are non-toxic and produce no smelly fumes to affect the delicious smell of the cooking food and its final taste;
7. the package is inexpensive to manufacture using existing, under utilized plant in the charcoal briquetting and paper pulp molding industries; and
8. by dint of the aforementioned attributes, the user will perceive much better value than would be expected from an inexpensive, disposable product.

DESCRIPTION OF THE PREFERRED EMBODIMENT

Figure 1:
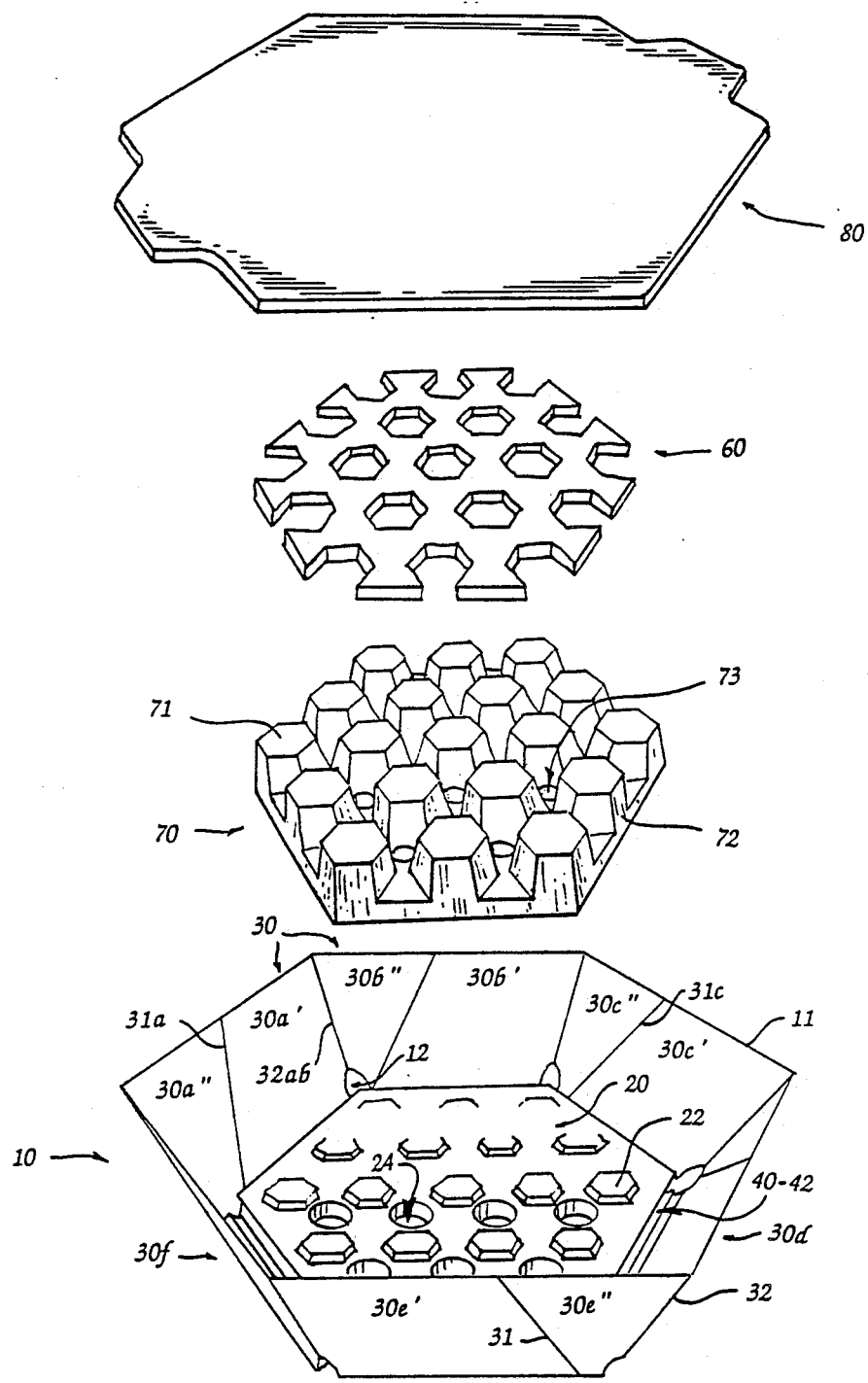
FIG. 1 is an exploded view of the preferred embodiment of the invention with the body in the open position.

As particularly shown in FIGS. 1 through 4 the preferred embodiment of the present invention is a package 1 comprised of a unitary firebox body 10 which further contains a fuel member or material 70 and further supports a cooking surface 80.

The body 10 is preformed and is further comprised of a bottom panel 20 which is substantially hexagonal in plan view and is connected at each of its six sides to one of six surrounding side panels 30 by three pleated panels 40, 41 and 42. The separate six side panels are designated 30a-f. The respective pleated panels are designated 40a-f, 41a-f and 42a-f. The body 10 is substantially a bi-stable structure with the two states being "open" and "closed" as described below.

Figure 2:
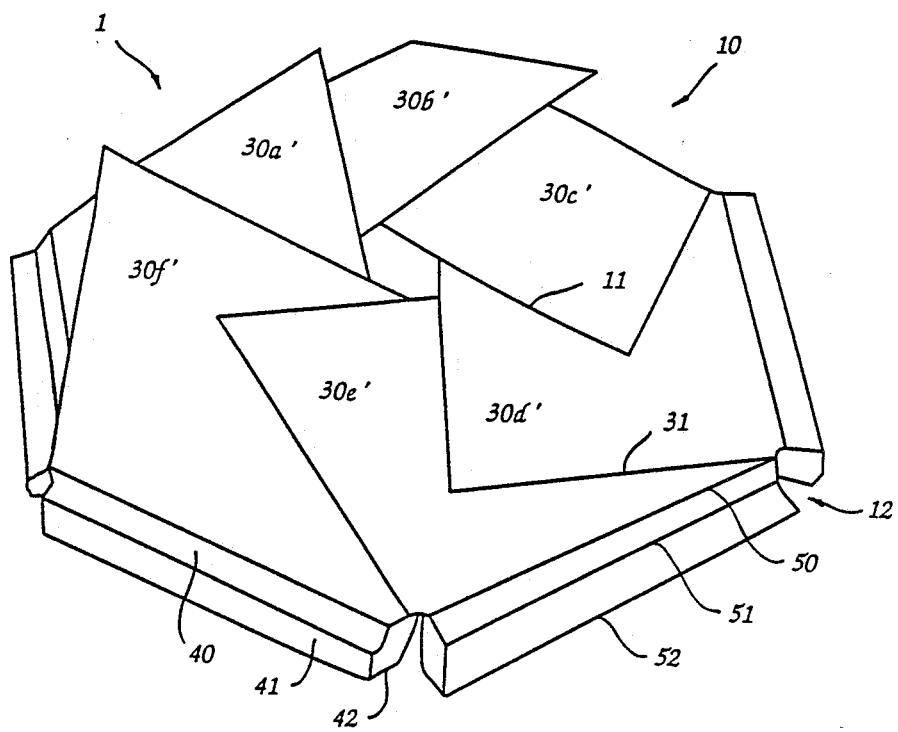
FIG. 2 is a perspective view of the body in the closed position.

FIG. 2 illustrates the body 10 in a closed position. In the closed position, the side panels 30 of the body 10 are in a collapsed, compact state and located substantially over the top of the bottom panel 20 packaging therebetween the fuel 70 and other things useful to barbecue cookery. The body 10 in this closed state might, for example, contain fuel igniter 60, disposal packages and other utensils 90, a collapsed grill 87 and so forth.

FIG. 1 illustrates the body 10 in the open position. In the open position, the side panels 30a-f of the body 10 project upwardly and outwardly from the bottom panel 20 to form a cup shaped cavity with the fuel 70 and fuel igniter 60 in the cavity bottom and whereby the cooking surface 80 may be placed along top edge 11 of the body 10 and thus, the body 10 and fuel 70 are positioned for use. Also, in the open position, the other contents of the body 10 in the closed position may be removed or otherwise positioned for use.

Figure 3:
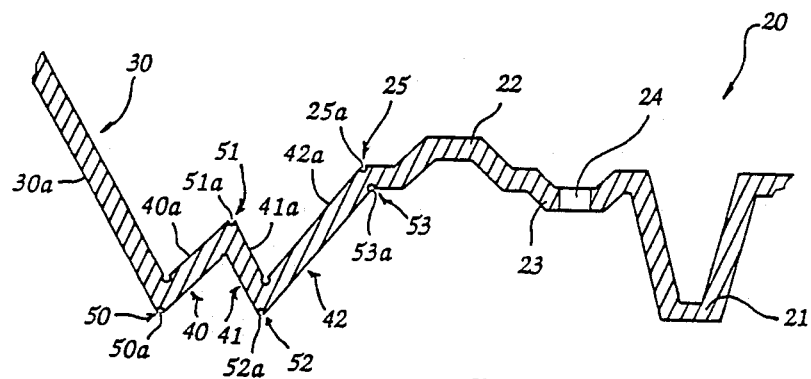
FIG. 3 is an elevational cross-sectional view of a portion of the body in the open position.

As shown in FIG. 3, the bottom panel 20 includes a plurality of long downwardly projecting bosses 21, which support the bottom panel 20. Above the surface on which the opened body 10 rests for use, a plurality of short bosses 22 project upwardly from the plane of the bottom panel 20 and provide means for support of the fuel 70 and fuel igniter 60. A plurality of short, downwardly projecting bosses 23 which include open passageways 24, enhance the passage of air to aspirate the fuel 70. In addition to the individual functions of these bosses 21, 22 and 23, the bottom panel 20 as a whole is benefited structurally by such reticular elements.

When viewed from inside open body 10, the six side panels 30a-f are comprised of a left panel portion 30a'-'-f', respectively, and a right panel portion 30a'-f', respectively. Each pair of panel portions, such as panel portions 30a' and 30a", are integrally joined by a creased fold or hinge 31, in this case 31a. Hinge 31 extends from a point approximately midway along top edge 11 downwardly, inwardly, and leftwardly, passing through panel 40 to a terminus along the edge of air duct 12. Adjacent side panels, such as 30a and 30b, are connected by a fold or hinge 32, in this case 32ab, between the right inside panel portion, in this case, 30a', and the adjacent left inside panel portion, in this case, 30b".

The pleated panels 40, 41 and 42 connect the side panels 30a–f to the bottom panel 20. As shown in FIG. 3 hinge 50, such as hinge 50a, connects side panel 30, in this case 30a with the adjacent pleated panel 40, in this case 40a. Hinge 51, such as hinge 51a, connects pleated panel 40, in this case 40a, with the adjacent pleated panel 41, in this case 41a. Hinge 52, such as hinge 52a, connects pleated panel 41, in this case 41a, with the adjacent pleated panel 42, in this case 42a. Hinge 53, such as hinge 53a, connects pleated panel 42, in this case 42a, with the edge 25 of bottom panel 20, in this case 25a.

Opening 12 extends from a point near the intersection of adjacent hinges 50, such as 50a and 50b, and hinge 32, in this case 32ab, to a point near the intersection of adjacent hinges 53, in this case 53a and 53b, and the intersection of the proximate edges of bottom panel 20, in this case 25a and 25b. The overall width of opening 12 is about 0.25 inch. The functions of opening 12 are primarily:

to facilitate the transformation of body 10 between open and closed;
to facilitate the use of the package 1 in all its positions;
to facilitate the aspiration of the fuel 70; and
to facilitate the use of the closed body 10 as a package containing fuel 70, fuel igniter 60 and other things useful to barbecue cookery.

As a result, there are many shapes and sizes of opening 12 which will serve the intended functions.

In the body open position shown in FIG. 3, the pleated panels 40, 41 and 42 fold corrugatedly such that hinges 50 and 52 substantially rest on the surface on which the open body 10 rests for use and, in contrast, bottom panel 20 and hinges 51 and 53 are upward from this surface. The angle which these pleated panels 40–42 make with the surface on which the open body 10 rests for use varies with the dimensions of the pleated panels 40–42 and the preferences of the user. The pleated panels 40–42 in this open position, among other things, add to the stability and structural integrity of body 10 as a whole.

Figure 4:
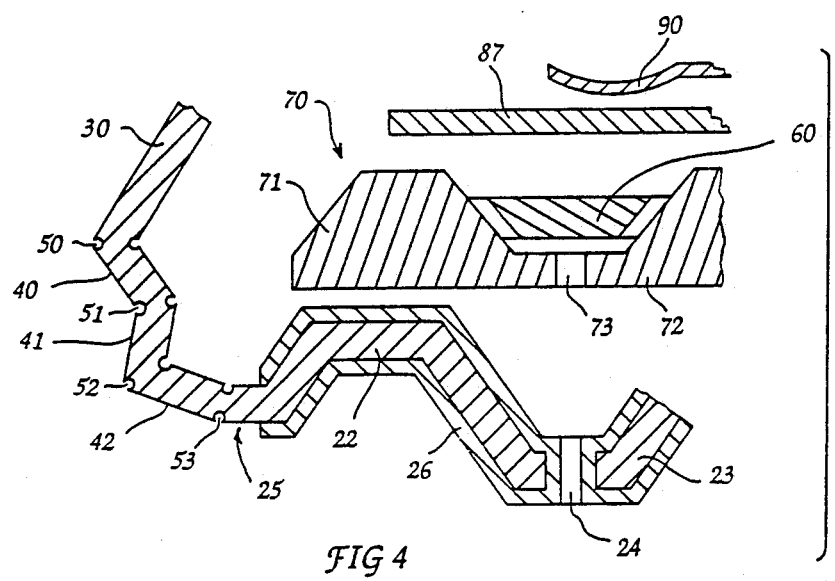
FIG. 4 is an elevational cross-sectional view of a portion of the body and its contents in the closed position.

In the body closed position shown in FIG. 4, the pleated panels 40–42 are folded substantially opposite to their orientation in the open position such that the closed body 10 forms a package with a large flexible cavity which conveniently encloses fuel 70, fuel igniter 60, utensils 90 and other things appropriate to the effective use of the present invention. The body is typically used with a rigid grill or cooking surface 80 but, if used, a collapsible grill can be packaged in the closed body 10 as well.

Fuel 70 is comprised of briquetted charcoal matter. Fuel 70 is further comprised of a plurality of truncated hexagonal pyramidal structures 71 rising from the plane of hexagonal bottom plate 72, ¼ inch thick by 4 inches on a side in a typical version of the preferred embodiment. The structures 71 taper from about 1.25 inches across the flats at the bottom where the structures 71 join the bottom plate 72 to about 0.950 inches at the top. At the interstices of the pyramidal structures, there are air passageways 73 which are about 0.375 inch in diameter.

Fuel igniter 60 is comprised of paper approximately ¼ inch thick which has been treated with wax or other substance to aid in its combustion. Fuel igniter 60 is reticulated such that when it is positioned for use, the interstices of fuel 70 are substantially filled in with the readily ignitable substance of fuel igniter 60.

In the typical version of the preferred embodiment using a fuel 70 with 4 inch hexagonal edges the side panels 30 have a length of 6 inches at the top body edge 11, 4 inches at the bottom edge and a width of 4⅜ inches and produce vertical height of about 3.2 inches in the body open position.

Figure 5:
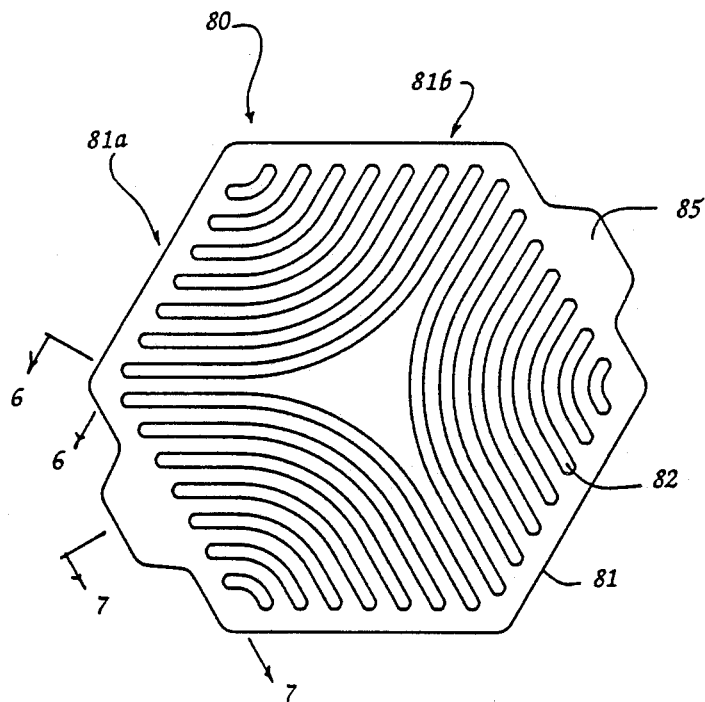
FIG. 5 is a plan view of the cooking surface.
Figure 7:
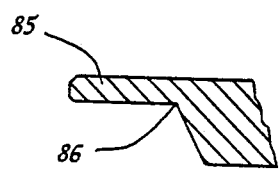
FIG. 7 is a sectional view of a portion of the cooking surface shown in FIG. 5 taken along line 7—7 in the direction of the arrows.

The cooking surface 80 is comprised of an aluminum grating which has substantially non straight elements with substantially no cross bars which might collect grease during cleaning. FIG. 5 is cooking surface 80 in plan view. Slots 82 which extend from approximately ½ inch from edge 81, such as 81a, to approximately ½ inch from an adjacent edge 81, in this case 81b, are substantially parabaloid in shape. Slots 82 are approximately 0.550 inch wide at the top tapering to 0.300 inch at the bottom. Since the side panel top edge is approximately 6 inches long, the edge 86 is somewhat smaller such that cooking surface 80 will nest along the top edge 11 of the open body 10. The nominal thickness of cooking surface 80 is 0.250 inch. The upper rim 81 is approximately 0.085 inch thick. Edge 84 is beveled approximately 28 degrees from normal. The edge 83 of handle 85 protrudes approximately 0.850 inch from edge 86.

FIG. 4 illustrates the package 1 in the closed position. Fuel 70 rests on bottom panel 20. Fuel igniter 60 is pressed into the interstices of fuel 70. On top of the aforementioned lie any utensils 90 and/or collapsed cooking surface 87. In the body closed state, the pleated panels 40, 41 and 42, and the side panels 30a–f are substantially above bottom panel 20. Normally in the closed position, package 1 rests on bottom panel 20. The side panels are folded so that they extend upward and inward substantially covering the contents of package 9 such as fuel 70, fuel igniter 60, utensils 90 and collapsed cooking surface 87. FIG. 2 illustrates package 1 in the closed position. As illustrated in FIG. 2, the inside right side panel portions 30a'f, such as 30a', are tucked under the inside left panel portions 30a"–f", in this case 30a" via hinge 31, in this case 31a. By such tucking, the body 10 is transformed to its closed state.

FIG. 1 illustrates the package 1 in the open position. Fuel 70 and fuel igniter 60 do not substantially shift position when package 1 is converted from closed to open. However, utensils 90 and/or collapsed cooking surface 87 are usually removed for use elsewhere. Bottom panel 20 moves such that it is substantially up and off the surface upon which package 1 rests for use. Pleated panels 40–42 fold corrugatedly such that bottom support bosses 21 and hinges 50 and 52 substantially rest on the surface on which open body 10 rests for use, and in contrast, bottom panel 20 and hinges 51 and 53 are substantially upward from this surface. In the open position, the side panels 30a–f project outwardly and upwardly from bottom panel 20.

The anticipated scenario for use of the present invention is as follows:
1. The cooking surface 80 and the package 1 in its closed position are transported to the intended site of use.
2. The package 1 is folded to its open position, and thus, fuel 70 and igniter 60 are in a position for use.

Utensils 90 and/or collapsible cooking surface 87 are removed to be positioned for use.

3. The cooking surface 80 is then fitted to the body 10 such that bottom edge 81 of the cooking surface 80 and the top edge 11 of the body 10 are brought into juxtaposition. At this point, structurally, the shell has been substantially completed, and a rigid, robust structure is resultant.
4. The next step is to light the fuel 70 in preparation for cooking. In this embodiment, there is a mesh-like paper insert 60 which serves to aid the igniting of the fuel 70.
5. After cooking, the present invention may be discarded or re-charged with fuel 70 and other things to facilitate its re-use.

To complete the description of this embodiment of the present invention, some additional features are now presented.

Element 26 shown in FIG. 4 comprises, in this embodiment, a coating which is a means for maintaining the structural integrity of bottom panel 20 under conditions of high heat. In this embodiment, this element 26 may be substantially comprised of gypsum or ceramic.

There may be at least one passageway 21 which comprises a port through which air passes for aspirating the fuel 70. The ducts 12 are substantially through adjacent side panels 30, such as 30a and 30b, and/or the related pleated panels 40-42, in this case, 40a-b, 41a-b and/or 42a-b.

There are a plurality of fuel support bosses 22. In addition to supporting the fuel and strengthening the bottom panel, the boss 22 aids in the aspiration of the fuel 70. Typically, in this embodiment, air flows through air passageway 24 and up through air duct 73 in the fuel 70, thus efficiently aspirating the fuel 70 during combustion. Ash or some other obstruction may restrict the aspiration of the fuel 70 through a particular pathway. However, air is free to pass through passageways 24 and/or 12 and then to pass laterally between the fuel support bosses 22, thus providing additional means for aspirating the fuel 70 and improving the combustion of the fuel 70.

The body 10 is treated with borax and/or boric acid as a flame retardant.

In the preferred embodiment, the hinge means employed by hinges 31, 32 and 50-53, may be a crease or fold in the fibrous body 10.

Various alternatives to the preferred embodiment are described below:

There may be many suitable materials for body 10. A water degradable fibrous material has been cited in the preferred embodiment because it is easy and inexpensive to form, environmentally responsible, easy to treat for flame retardancy and aesthetically pleasing. However, there are many polymers, resins, organic fibers, such as cotton, flax and wool, and inorganic fibers, such as glass and asbestos which would do well. Materials not in fibrous form, such as metals, glass or wood, in the form of sheet or mesh would also be suitable.

Depending on the material used for body 10, the treatment for flame retardancy will vary. With some materials such as metal, glass and other inorganic substances, no treatment may be necessary. For other materials there are many phosphates and other flame retardants available.

Figure 6:
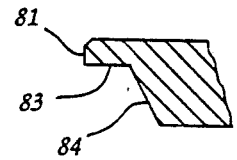
FIG. 6 is a sectional view of a portion of the cooking surface shown in FIG. 5 taken along line 6—6 in the direction of the arrows.

The cooking surface 80 is die cast hard anodized aluminum grill. The plan view of the preferred embodiment is illustrated in FIG. 6. This version is robust enough for repeated cleansing by hand or machine and then re-use. However, the cooking surface may be of stamped aluminum, steel or other metal. It may be wire gauze, cloth, mesh or grating. It may be non metallic, such as, glass, solid or fibrous, asbestos or organic fiber coated, treated and/or lined for fire retardancy. Furthermore, there are a variety of designs which offer a different appearance which may be employed. The grill of the preferred embodiment is unitary, but there are a variety of multipiece or collapsible designs which may or may not employ cross bars or holes or other structures.

The present invention functions well without any bosses or air ducts. The number, size, shape and position of the air ducts, such as 12, 24, 73, and bosses, such as 21, 22, and 23, will vary with the additional function desired from these features.

Hinge 31 runs from some point along top edge 11 to some terminus along air duct 12. In another embodiment, hinge 31 may terminate at the intersection corner hinge 32, such as 32ab, and the adjacent hinges 50, in this case, 50a and 50b. In still further embodiments, hinge 31 may pass through some other portion of pleated panels 40, 41, and/or 42. If this terminus is placed such that hinge 31 traverses some part of the pleated panels 40, then in the open position, the adjacent side panel portions 30a' and 30a", are rendered substantially planar. This planar relationship facilitates the placement of the cooking surface 80 in a position for use.

There is no limitation of the ways to start fuel 70. For example, the fuel may be treated directly with flammable substance or there may be some flammable substance under the charcoal. Fuel igniter 60 may be comprised of some substance which readily supports the combustion of fuel 70.

The plane of bottom panel 20 in the closed state is low with regard to the side panels 30a-f. This relationship facilitates the closed body in its mode of flexible package. In the open state, bottom panel 20 pops up from the surface upon which opened body 10 rests for use. The present invention functions well without the bottom panel 20 being raised in the open position, but this raised position has the following among its attributes:

it helps keep heat from the surface upon which open body 10 rests for use;

it improves air circulation under bottom panel 20 which provides means for heat dissipation and aspiration of fuel 70; it brings the charcoal and grill closer together; and it improves the structural integrity of open body 10 as a whole;

The pleated panels 40-42 provide for:

a flexible, large cavity for storage in the closed state;

a means for transforming between closed and open states;

a means for attachment of bottom panel 20 to side panels 30;

a means of support of bottom panel 20 when body 10 is in opened state; and a site of air ducts 12.

The above intended function may be attained by some number of pleated panels 40 other than the three in the preferred embodiment. For example, if the bottom panel 20 does not pop up, then there may be no pleated panels 40 or any even number of pleated panels 40. In contrast, any odd number of pleated panels 40 will raise bottom panel 20 when body 10 is in the open state.

The functions of air ducts, such as 12, 24, and 73, are such that many combinations of number, size, shape and position of such openings could be employed. For example, air duct 12 might be shown cutting into side panels 30 and at least one pleated panel 40 not at the corners where hinge 32 joins adjacent side panels 30.

There are a variety of suitable fuels 70, such as treated paper, wood, charcoal, briquetted charcoal, coal and jellied flammables such as alcohol. The size, shape and position of fuel 70 may vary from the preferred embodiment.

As illustrated in FIG. 2, the inside right side panel portions 30a'-f', such as 30a', are tucked under inside left panel portions 30a"-f", in this case 30a", via hinge 31, in this case 31a. By such tucking, the body 10 collapses to its closed state. However, alternate folding arrangements may be employed. For example, the left panel portions, 30a"-f", such as 30a", might be tucked under the right panel portions, 30a'-f', in this case, 30a', via hinge 31, in this case 31a.

In the preferred embodiment of the present invention, element 26 is substantially a coating of gypsum or ceramic which is a means for maintaining the structural integrity of bottom panel 20 under conditions of high heat. But there are other coatings, linings, treatments and/or structures which may serve this end. Also, it may be beneficial to the present invention if some element(s) other than bottom panel 20 are so coated, lined or treated.

I claim:

1. A foldable firebox body comprising:
a bottom panel for supporting a fuel in the region above the top surface thereof, and
a plurality of side panels sequentially hingedly connected together around said bottom panel and each side panel hingedly connected to said bottom panel,
each of said side panels having at least two panel portions and having a hinge means for folding said panel portions in overlapping relationship
whereby said side panel portions can be folded to a body closed position with said side panel portions overlapping and substantially enclosing said region above said bottom panel and said side panel portions can be folded to a body open position with said side panels projecting outwardly and upwardly from said bottom panel for supporting a cooking surface.

2. The firebox body of claim 1 including a fuel supply positioned in the region above the top surface of the bottom panel in the body closed position.

3. The firebox body of claim 2 wherein said fuel is a preformed charcoal member having a base portion and a plurality of pyramidal portions projecting upwardly from said base portion.

4. The firebox body of claim 3 including an igniting member having apertures extending over and around said pyramidal portions of said charcoal member.

5. The firebox body of claim 1 characterized further in that said body is formed of a water degradable fibrous material.

6. The firebox body of claim 1 including a plurality of bosses projecting downwardly from said bottom panel to position said body on a support surface.

7. The firebox of claim 1 including a plurality of bosses projecting upwardly from said bottom panel for supporting a fuel member.

8. The firebox body of claim 1 wherein said bottom panel includes a fire retardant coating.

9. The firebox body of claim 1 including a grill member, said grill being positionable on the upper edge of said side panels in said body open position.

10. The firebox body of claim 9 wherein said grill member includes edges along each of said plurality of side panels and a plurality of spaced part substantially parabaloid shaped bar elements spaced inwardly of said edges.

11. The firebox body of claim 10 wherein said body includes an even number of said side panels, and said grill member includes grill member edges corresponding in number to said number of side panels, said bar elements arranged in sets half said number of side panels, said bar elements of each set extending from near one of said edges to near another edge adjacent to said one edge.

12. The firebox body of claim 1 containing utensils in body closed position.

13. A foldable firebox body comprising:
a bottom panel for supporting a fuel in the region above the top surface thereof, and
a plurality of side panels sequentially hingedly connected together around said bottom panel and each side panel hingedly connected to said bottom panel,
each of said side panels having at least two panel portions and having a hinge means for folding said panel portions in overlapping relationship and
a plurality of groups of pleated panels, each group of pleated panels including a plurality of pleated panels connected together and connecting one of said side panels to said bottom panel
whereby said side panel portions can be folded to a body closed position with said side panel portions overlapping and substantially enclosing said region above said bottom panel and said side panel portions can be folded to a body open position with said side panels projecting outwardly and upwardly from said bottom panel for supporting a cooking surface.

14. A portable cooking apparatus comprising:
a foldable firebox body having
a bottom panel with a plurality of side edges and for supporting a fuel in the region above the top surface thereof,
a plurality of side panels each having a plurality of connected edges and at least one free edge,
said side panels hingedly connected together sequentially along two substantially opposed connected edges of said side panels for folding,
a plurality of groups of pleated panels,
each group of pleated panels including a plurality of pleated panels connected together and connecting an edge of one of said side panels to one of said edges of said bottom panel,
each of said side panels having at least two panel portions and having a hinge means for folding said panel portions in overlapping relationship,
whereby said side panel portions can be folded to a body closed position with said side panel portions overlapping and substantially enclosing said region above said bottom panel and said side panel portions can be folded to a body open position with said panels projecting outwardly and upwardly from said bottom panel for supporting a cooking surface and a cooking surface member for positioning on the free edges of said side panels and spaced above said bottom panel when said body is in open position.

15. The apparatus of claim 14 including a fuel supply positioned in the region above the top surface of the bottom panel.

16. The apparatus of claim 15 wherein said fuel is a preformed charcoal member having a base portion and a plurality of pyramidal portions projecting upwardly from said base portion.

17. The apparatus of claim 16 including an igniting member extending over and around said pyramidal portions of said charcoal member.

18. The apparatus of claim 14 characterized further in that said body is formed of a water degradable fibrous material.

19. The apparatus of claim 14 including a plurality of bosses projecting downwardly from said bottom panel to position said body on a support surface.

20. The apparatus of claim 14 including a plurality of bosses projecting upwardly from said bottom panel for supporting a fuel member.

21. The apparatus of claim 14 wherein said bottom panel includes a fire retardant coating.

22. The apparatus of claim 14 including utensils in said body in body closed position.

23. A folding disposable cookery package comprising:

a unitary foldable firebox body comprising:

a bottom panel with a plurality of side edges and for supporting a fuel in the region above the top surface thereof, a plurality of side panels each having a plurality of connected edges and at least one free edge, said side panels hingedly connected together sequentially along two substantially opposed connected edges for folding, a plurality of groups of pleated panels, each group of pleated panels including a plurality of pleated panels connected together and connecting an edge of one of said side panels to one of said edges of said bottom panel, each of said side panels having at least two panel portions and having a hinge means for folding said panel portions in overlapping relationship whereby said side panels and said panel portions can be folded to a body closed position with said side panel portions overlapping and substantially enclosing said region above said bottom panel and said side panel portions can be folded to a body open position with said side panels projecting outwardly and upwardly from said bottom panel for supporting a cooking surface, a fuel member positioned on the top surface of said bottom panel, and a cooking grill for positioning on the upper edges of said side panels and spaced above said bottom panel when said body is in said open body position.

24. The apparatus of claim 23 wherein said fuel member is a preformed charcoal member having a base portion and a plurality of pyramidal portions projecting upwardly from said base portion.

25. The apparatus of claim 24 including an igniting member extending over and around said pyramidal portions of said charcoal member.

26. The apparatus of claim 23 characterized further in that said body is formed of a water degradable fibrous material.

27. The apparatus of claim 23 including a plurality of bosses projecting downwardly from said bottom panel to position said body on a support surface.

28. The apparatus of claim 23 including a plurality of bosses projecting upwardly from said bottom panel for supporting a fuel member.

29. The apparatus of claim 23 wherein said bottom panel includes a fire retardant coating.

30. The apparatus of claim 23 including utensils in said body in body closed position.

31. A grill for a foldable firebox comprising a grill member including a peripheral edge and a plurality of spaced apart substantially parabaloid shaped bar elements spaced inwardly of said edge, said bar elements arranged in a plurality of sets consecutively around said edge and providing bars over the major portion of the area of said grill member inwardly from the ends of the bar elements 32. The grill of claim 11 for a firebox including an even number of said side panels wherein said grill member includes edges corresponding in number to said number of side panels and with said bar elements arranged in sets half the number of said side panels, said bar elements of each set extending from near one of said edges to near another edge adjacent to said one edge.

* * * * *